Patented Feb. 29, 1944

2,342,662

UNITED STATES PATENT OFFICE 2,342,662

MERCAPTO-PHTHALOCYANINES

Norman Hulton Haddock, Blackley, Manchester, England, assignor to Imperial Chemical Industries Limited, a corporation of Great Britain No Drawing. Application April 29, 1941, Serial No. 390,912. In Great Britain May 13, 1940

17 Claims. (Cl. 8—37)

This invention relates to novel textile dyes, pigments and intermediates of the phthalocyanine series. More particularly, this invention relates to mercapto compounds of the general formula $Q—(SH)_x$, wherein $x$ is a numeral from 1 to 4, while Q stands for the radical of a phthalocyanine compound selected from the group consisting of metal-free phthalocyanines and metallic phthalocyanines of the benzene and naphthalene series, their homologs and substitution derivatives, e. g., halogen, nitro, phenyl, phenoxy, benzoyl, etc.; and to sulfur-type dyes derivable therefrom by oxidation of the mercapto groups.

Compounds of the phthalocyanine series find at present their greatest commercial use as valuable pigments for printing inks, paints and other pigmented coating compositions. It is known that the introduction of certain substituents, such as for instance sulfonic acid groups into the phthalocyanine molecule, renders the products soluble in water and produces direct dyes which can be used for textile and paper dyeing. However, such known water-soluble phthalocyanines are deficient in exhausting properties, and the wash fastness and other fastness properties of the dyeings on cotton are not entirely satisfactory.

It is known that many aromatic intermediates of the benzene and naphthalene series and some heterocyclic compounds can be fused with sulfur and alkali polysulfides to give vattable dyes, generally referred to as sulfur colors, which contain sulfur atoms in the molecule, and which can be dissolved in diluted alkaline sodium sulfide or hydrosulfite to give what appears to be a solution of the alkali salt of a mercapto compound. From this solution (or vat) textiles are dyed in various shades. When these dyeings are exposed to the air or other oxidizing agents, the water-soluble alkali salts are converted on the fiber into the original insoluble dye. While these known sulfur dyes are comparatively inexpensive, and are therefore used to a great extent for the dyeing of cotton and other fabric, they show, in general, quite inferior fastness properties and dull shades and they cannot be used for commercial textile printing by conventional vat dye methods, since the presence of free sulfur or sulfides in the printing paste renders the same unsatisfactory to be printed from engraved copper cylinders which are stained by such sulfur compounds.

It is known that one or several mercapto or disulfide groups can be introduced into aromatic amino compounds by converting the amino groups over the diazo derivatives into mercapto groups, by methods well known in the prior art. However, such known and synthetically prepared aromatic mercapto compounds do not possess sufficient substantivity to textiles and similarity to commercial sulfur colors in dyeing properties to be useful as textile dyes.

It is known that substituents can be introduced into the phthalocyanine molecule, either by a direct substitution process, such as for instance by halogenation or sulfonation, or by synthesizing phthalocyanines from substituted intermediates, such as aromatic substituted nitriles, ortho-dicarboxylic acids, or derivatives thereof. However, the introduction of the mercapto or disulfide groups into a phthalocyanine molecule has not heretofore been accomplished by any method described in the prior art.

This invention has as its object to prepare new mercaptophthalocyanine derivatives which can be applied to textiles in much the same way as commercial sulfur colors, but which possess much superior fastness properties and very desirable bright bluish-green to greenish-blue shades, such as have not been obtained heretofore from any known commercial sulfur dye. A further object of the invention is to utilize the well known and outstanding tinctorial strength and clarity of the pigment shade, shown by compounds of the phthalocyanine series, for the dyeing and printing of cotton, wool and other common fabric. A still further object is the preparation of intermediates of the phthalocyanine series which possess one or several functional groups not heretofore available in phthalocyanine compounds. These groups serve particularly well for the introduction of very desirable substituents into commercial phthalocyanines.

These objects are accomplished by the following invention. It was discovered that mercapto compounds of the phthalocyanine series can be obtained readily from the corresponding aminophthalocyanines by known methods, for instance by converting the amino compounds into the diazo derivatives which in turn are converted to the xanthate esters, followed by hydrolysis at elevated temperatures. These alkali-soluble mercapto compounds are readily oxidized by air or other oxidizing agents to form water-insoluble disulfides. These dyes can be redissolved in aqueous sodium sulfide solution, forming a vat from which textiles can be dyed much in the same manner as commercial sulfur colors. The final bluish-green or greenish-blue dyeings obtained from these products on cellulosic material show outstanding fastness to washing and light and are, in general, equal in fastness properties and clarity of shade to the best known anthraquinone vat dyes. The dyeings are dischargeable to good whites by steaming after treatment with dimethyl (sulfobenzyl) phenyl ammonium chloride, sodium hydroxide and sodium formaldehyde sulfoxylate solutions. The new sulfur-containing dyes may also be used for printing on textiles by conventional printing methods which are used for the printing of anthraquinone and indigoid vat dyes, preferably by the glucose-caustic soda method.

The new mercapto compounds, obtained by this invention, also serve as intermediates for the preparation of desirable new pigments and colored compounds such as thioglycolic acids, thioethers, thioesters, and other products which can be obtained by replacement of the reactive hydrogen (attached to the sulfur atom) by various aliphatic or aromatic radicals.

Instead of starting with the amino-phthalocyanines, one or more mercapto groups can also be introduced into the phthalocyanine molecule by replacing hydrogen or halogen atoms in phthalocyanines by sulfur, whereby disulfides are formed which may be treated with alkaline reducing agents to give the corresponding mercapto compounds. Thus, chlorinated copper phthalocyanine reacts under suitable conditions (for instance when treated in pyridine solution with alkali polysulfides) to give disulfide derivatives which are similar in dyeing properties to the mercapto compounds obtained from amino copper phthalocyanines.

The amino-phthalocyanines, which serve as the preferred starting materials for the products of this invention, are obtainable by the methods described in British Patent 529,847. They are preferably made by subjecting 4-nitro-phthalimide, or mixtures of 4-nitro-phthalimide together with unsubstituted phthalimide in molecular proportions (in ratios of 1:3, 2:2, or 3:1), to the usual fusion with metal salts in the presence of urea and ammonium molybdate, followed by reduction of the resulting nitro compounds with sodium hydrogen sulfide. They may also be obtained from the corresponding nitro-phthalonitrile or from mixtures of nitro-phthalonitrile with unsubstituted phthalonitrile, according to known methods. Among the aminophthalocyanines which are particularly suitable as starting materials for the mercapto compounds covered by this invention, may be mentioned:

Copper-tetra-(4)-aminophthalocyanine,
Copper-tri-(4)-aminophthalocyanine,
Copper-di-(4)-aminophthalocyanine,
Copper-mono-(4)-aminophthalocyanine,
Cobalt-tetra-(4)-aminophthalocyanine,
Nickel-tetra-(4)-aminophthalocyanine,
Metal - free - tetra-(4)-aminophthalocyanine.

The conversion of the diazo compounds, obtained from the above aminophthalocyanines, to the mercapto derivatives is preferably carried out by the xanthate method, illustrated in the examples. However, other reagents, which are known to be suitable for the conversion of aromatic diazo groups into mercapto groups, may be employed, among which may be mentioned: Alkali metal thiocyanates, the resulting thiocyanate being treated with, e. g., potassium sulfhydrate (see Gattermann and Hausknecht, Berichte der deutschen Chemischen Gesellschaft, 1890, volume 23, page 738) and alkali metal thiosulfates (see Die Methoden der organischen Chemie, Houben, 1924, volume 4, page 628).

In its broadest aspects, this invention includes the manufacture of sulfur-containing dyestuffs by the oxidation of mercaptophthalocyanines, however obtained, and also the use of these mercaptophthalocyanines as intermediates for novel dyes suitable for pigmentation purposes or decoration of textiles or the coloring of gasoline, oils, plastic masses and similar material.

I have further found that the intermediate products in the manufacture of the above-mentioned sulfur dyestuffs, namely, the phthalocyanine xanthate esters or thiocyanophthalocyanines, can themselves be applied to cellulosic material from sodium sulfide solution according to the usual practice with sulfur dyestuffs. By this procedure the phthalocyanine xanthate esters or thiocyanophthalocyanines become hydrolysed in the sodium sulfide solution to mercaptophthalocyanines. Thus by the dyeing technique usual with sulfur dyestuffs there are produced on the fiber, the same sulfur dyestuffs, to the production in substance of which the aforementioned process relates. In this way also, there are obtained dyeings with the properties which have already been described. Accordingly, the present invention relates not only to the manufacture by the aforesaid process of sulfur dyestuffs in substance but also to their production on the fiber, that is on the cellulosic material, directly by application thereto of the intermediate products in the manufacture process, which are phthalocyanine xanthate esters and thiocyanophthalocyanines. The above special feature of this invention is being described in further detail and claimed in a copending application, filed by me as a continuation-in-part of the instant application, Ser. No. 482,822, filed April 12, 1943.

The invention is further illustrated, but not intended to be limited, by the following examples, in which the parts are by weight.

*Example I*

20 parts of copper tetra-(4)-aminophthalocyanine in the form of a finely-milled 5% aqueous paste are added to 240 parts of 36% hydrochloric acid with good agitation. The mixture is stirred at 5° C. and a solution of 13 parts of sodium nitrite in 250 parts of water is added quickly, the temperature of the mixture being allowed to rise to 10° C. The clear green solution of the tetradiazo compound is added to a solution of 40 parts of potassium ethyl xanthate in 200 parts of water at 50–55°. During the addition of the tetradiazo compound sufficient of a 20% solution of sodium carbonate is added simultaneously to keep the mixture alkaline. The green precipitated xanthate ester is filtered and washed with water.

10 parts of the xanthate ester are boiled with 100 parts of 33% aqueous sodium hydroxide solution for one hour. The mixture is poured into 300 parts of water. The resulting dark blue solution is made acid with acetic acid and the precipitate filtered off and dried. The product is a green powder, insoluble in water and dilute alkalis but soluble in hot dilute aqueous sodium sulfide to give a dark blue solution. It is probably a polydisulfide derived from copper tetra-(4)-mercaptophthalocyanine. A hot solution of the product in dilute aqueous sodium sulfide dyes cotton in dull blue shades which on exposure to the air yield bright bluish-green dyeings of outstanding fastness to washing, soap boiling, chemick and light.

*Example II*

A mixture of 55 parts phthalimide, 24 parts 4-nitrophthalimide, 111 parts urea, 20 parts cupric chloride, 2 parts boric acid and 0.5 part ammonium molybdate in 400 parts kerosene was heated at 190 to 210° C. for 4 hours while stirring. After cooling, the product was separated from the kerosene by filtration and drying. The crude product was extracted repeatedly with dilute hydrochloric acid and caustic soda. The dry, extracted mono nitro-copper phthalocyanine was stirred into ten times its weight of 98% sulfuric acid at 5-7° C. and the resulting solution was drowned in hot water to give a finely divided product. After filtering off and washing free of acid, the filter cake was made up to a 10% paste by stirring with water. 200 parts of this paste were heated under agitation with 68 parts of a solution containing 33% of sodium sulfhydrate for several hours at 85-90° C. The resulting mono-amino-copper phthalocyanine was filtered off and washed. The filter cake was dispersed with water to give a diluted suspension and the product was diazotized by adding 12 parts of concentrated hydrochloric acid solution, cooling to 0-5° C., and adding 12.5 parts of 20% sodium nitrite solution. The resulting diazo suspension was added at 50-60° C. to a solution containing 6.5 parts of sodium xanthate and 4 parts of soda ash.

After cooling to about 40° C., the resulting xanthic ester was filtered off, washed and the product refluxed with 100 parts of alcohol and 20 parts of caustic soda for 2 hours. The resulting reaction mass was acidified and the product filtered off, washed and dried. The copper-mono-(4)-mercaptophthalocyanine, thus obtained, is slightly soluble in sodium sulfide solution from which cotton is dyed in greenish-blue tints.

*Example III*

By proceeding as in the above Example II, except using 36.8 parts of phthalimide and 48 parts of 4-nitrophthalimide instead of the amounts there given, a di-nitro-copper phthalocyanine is obtained. This product was reduced to a diamino copper phthalocyanine with sodium sulfhydrate and subjected to the same series of reactions, described in the preceding example, to give copper-di-(4)-mercaptophthalocyanine. This product shows better solubility in sodium sulfide solution than the product of Example II and gives strong and bright bluish-green shades on cotton when dyed from an alkaline sodium sulfide vat, followed by exposure of the dyeings to air oxidation.

*Example IV*

By substituting 18.4 parts phthalimide and 72 parts 4-nitrophthalimide in the above Example II, a tri-nitro-copper phthalocyanine is obtained. When carried through a similar series of reduction and other reactions as described above, copper tri-(4)-mercaptophthalocyanine is obtained, which shows better solubility than the di-mercapto derivative in alkaline sodium sulfide solution and dyes cotton therefrom in very strong shades, similar to those obtained from the product of Example I.

*Example V*

If in the above examples for preparing mercapto derivatives of copper phthalocyanine, the solutions containing the sodium salts of the mercapto compounds are treated with chloroacetic acid in alkaline solution at temperatures between 40° C. and 100° C., the corresponding thioglycolic acid derivatives of copper phthalocyanine are formed. For example, the reaction mass obtained by refluxing the xanthate ester from 25 parts of tri-(4)-nitro copper phthalocyanine (which has been reduced, diazotized and reacted with sodium xanthate) with 80 parts alcohol, 25 parts caustic soda for two hours, is diluted with about 80 parts water and cooled to about 40° C. To this suspension are added 20 parts chloroacetic acid, and the resulting alkaline mixture heated to the boiling point and the alcohol distilled out. The suspension is then diluted and acidified by a mineral acid. The tri-(4)-thioglycolic acid derivative of copper phthalocyanine is completely precipitated and can be filtered off, washed and dried. The alkali salts of this product are slightly soluble in water with a blue coloration. The sodium salts of the mono- and di-thioglycolic acid derivatives of copper phthalocyanine are less soluble than the tri-thioglycolic acid, while the salts of the tetra-thioglycolic acid are more soluble.

*Example VI*

One mole of chlorinated copper phthalocyanine (containing 14.5 atoms of chlorine per molecule) was heated with four moles of sodium disulfide in pyridine solution for 24 hours at reflux temperature. A bright green sulfur-containing dye was isolated from the reaction mass by filtration of the diluted fusion, after acidification with hydrochloric acid. A somewhat bluer product was obtained by refluxing one mole of chlorinated copper phthalocyanine (containing ten atoms of chlorine per molecule) with four moles of sodium disulfide in pyridine solution. Both products, when treated with sodium sulfide and caustic soda give deep colored solutions from which cotton was dyed in bluish shades which, by air oxidation, were converted to bright green to bluish-green dyeings of excellent fastness properties.

The above-described, sulfur-containing products can be applied to textiles satisfactorily by commercial dyeing methods, such as are used for sulfur colors. The following procedure serves to illustrate a preferred dyeing method.

*Example VII*

7 parts of the isolated dyes (from Examples I to V) are dissolved in a solution of 100 parts of sodium sulfide and 50 parts of soda ash at 190° F. The cotton fiber is dyed in this solution at 180 to 190° F. for one hour, with the addition of 30% of common salt. The dyeings are then removed from the bath and oxidized by exposure to air or with sodium perborate or sodium bichromate to develop the final shade which is soaped and finished in the usual manner.

*Example VIII*

20 parts of copper tetra-(4)-aminophthalocyanine in the form of a finely-milled 5% aqueous paste are added to 240 parts of 36% hydrochloric acid with good agitation. The mixture is stirred at 5° C. and a solution of 13 parts of sodium nitrite in 250 parts of water is added quickly, the temperature of the mixture being allowed to rise to 10° C. To the clear diazo solution at 10° C. is added a solution of 40 parts of sodium thiocyanate dissolved in the minimum quantity of water. There is an immediate evolution of nitrogen and a green precipitate is formed. The mixture is stirred at room temperature for ½ hour and finally heated to 90° for a further ½ hour. The green precipitate of copper tetra-(4)-thiocyanophthalocyanine is filtered off, washed with water and finally with alcohol.

The filter-cake is now suspended in a mixture of 500 parts of alcohol and 170 parts of 20% aqueous sodium sulphide solution. The mixture is boiled and stirred until all the suspended matter has dissolved and a grey-blue solution of the sodium mercaptide has been obtained. A stream of air is now passed through to oxidise the sodium mercaptide. The product, probably a polydisulfide, forms a green suspension. It is filtered off, washed with water and dried.

The product is a green powder which is insoluble in dilute alkalis. It is also insoluble in water but is soluble in hot dilute aqueous sodium sulphide to give a dark blue solution. It is probably a polydisulphide derived from copper tetra-(4)-mercaptophthalocyanine. A hot solution of the product in dilute aqueous sodium sulphide dyes cotton in dull blue shades which on exposure to the air yield bright green dyeings of outstanding fastness to washing, soap boiling, chemick and light.

The above sulphur dyestuffs can also be produced directly on the cellulosic fibre in the following manner. In this way a similar shade is obtained to that got by applying to the cellulosic material the sulphur dyestuff first made in substance.

1 part of copper tetra-(4)-thiocyanophthalocyanine (obtained as described above), 1.5 parts of sodium sulphide crystals, 1 part of anhydrous sodium carbonate and 20 parts of water are boiled together until a clear solution is obtained. The copper tetra-(4)-thiocyanophthalocyanine thereby becomes hydrolysed to copper tetra-(4)-mercaptophthalocyanine. The solution is diluted with 3000 parts of warm water, and 100 parts of bleached cotton yarn, previously well wetted-out by soaking in cold water, are immersed therein. The solution is heated to 85° C. 15 parts of sodium chloride are added. The temperature is maintained at 85° C. and at the end of ½ hour a further addition of 15 parts of sodium chloride made, the cotton being occasionally turned. After a further ¼ hour the cotton yarn is removed, squeezed, rinsed in cold water and allowed to hang in the air. The copper tetra-(4)-mercaptophthalocyanine on the yarn becomes oxidised (probably forming a polydisulphide) and the cotton yarn acquires a bright green shade.

*Example IX*

20 parts of nickel tetra-(4)-aminophthalocyanine in the form of a finely-milled 2.2% aqueous paste are added to 300 cc. of 36% hydrochloric acid with good stirring. 60 parts of 10% aqueous sodium nitrite solution are added at below 10° C. As soon as a clear solution of the tetradiazo compound has been obtained, 20 parts of ammonium thiocyanate dissolved in a little water are quickly added. The mixture is stirred for ½ hour at 15° C. and then warmed to 90° C. for a further ½ hour at complete the reaction. The green suspension of nickel tetra-(4)-thiocyanophthalocyanine is filtered and converted to nickel tetra-(4)-mercaptophthalocyanine and then to a polydisulphide in the manner described for the copper derivative in Example VIII.

The product is a green powder soluble in warm dilute aqueous sodium sulphide solution to give a dark green solution from which cotton is dyed in green shades of excellent fastness to washing, soap boiling and light. The shades are yellower than those obtained from the corresponding copper derivative of Example VIII.

*Example X*

300 parts of a 5% aqueous paste of copper tri-(4)-aminophthalocyanine are added with vigorous stirring to 300 parts of 36% hydrochloric acid. The bright blue suspension of the hydrochloride thus obtained is cooled to 0–5° C. and 75 parts of 10% aqueous sodium nitrite solution are added rapidly. A clear, bright green solution of the tridiazo compound is immediately formed. After stirring for one minute, a solution of 25 parts of sodium thiocyanate in 100 parts of water is added quickly. The resulting green suspension is warmed to 90° C. during about one hour, and maintained at 90–95° C. for ¼ hour. The product is filtered off and washed with water until acid-free, and then with alcohol. The copper tri-(4)-thiocyanophthalocyanine, so-obtained, is hydrolysed and oxidised in the manner described in the first part of Example VIII.

The resulting product is a sulfur-containing dyestuff which dyes cotton in bright green shades of excellent fastness to washing, chemick, soap-boiling and light.

*Example XI*

300 parts of a 5% aqueous paste of copper di-(4)-aminophthalocyanine (obtained as described below) are diazotised as in Example X but using 50 parts of 10% sodium nitrite solution instead of 75 parts. The diazo solution is added to a solution of 20 parts of potassium ethyl xanthate in 100 parts of water at 50–60° C. At the same time sufficient sodium carbonate is added to keep the solution alkaline. The suspension of xanthate ester so-obtained is cooled to 40° C. and filtered. The xanthate ester is washed with water, hydrolysed to copper di-(4)-mercaptophthalocyanine and oxidised, as described in Example I.

The resulting sulphur-containing dyestuff (probably a polydisulfide) dyes cotton from sodium sulfide solution, in green shades of excellent fastness to washing, soap-boiling, chemick and light. The shades are bluer than those obtained from the dyestuff of Example X.

Copper di-(4)-aminophthalocyanine is made by heating 38.4 parts of 4-nitrophthalimide, 29.4 parts of phthalimide, 120 parts of urea, 20 parts of anhydrous cupric chloride, 1 part of ammonium molybdate, 2 parts of boric acid and 300 parts of commercial α-chloronaphthalene at 140–145° C. for 3 hours, and reducing the so-obtained copper di-(4)-nitrophthalocyanine with sodium hydrogen sulphide.

It will be understood by those skilled in the art that many variations and equivalents may be used in the above-illustrated processes, without departing from the spirit of this invention. Thus, the diazotization of the amino derivatives may be accomplished by using sulfuric acid in place of hydrochloric acid. The acid concentration used for the diazotization may be varied within wide limits, but best results are obtained with comparatively strong acid (10%) concentration.

Hydrolysis of the xanthate ester may be accomplished equally well by the use of less concentrated (aqueous or alcoholic) caustic soda solutions, or by replacing the sodium hydroxide, used in the above Examples I to V, by an equivalent amount of potassium hydroxide.

In the claims below the expression "disulfide" or "disulfide group" when used in conjunction with a phthalo-cyanine compound, is to be understood as referring to the group —S—S— the free linkages of which are attached to carbon atoms of the same phthalocyanine molecule or two different phthalocyanine molecules.

I claim:

1. Polydisulfide dyes of the phthalocyanine series.

2. A sulfur dyestuff derived by oxidation of a phthalocyanine mercaptan, said dyestuff being characterized by solubility in aqueous sodium sulfide and by dyeing cotton from said solution, which dyeings after oxidation on the fiber are fast to washing, chemick and light.

3. A dyestuff compound characterized by possessing in its structure at least one phthalocyanine radical and at least one disulfide group, said compound being further characterized by solubility in aqueous sodium sulfide from which solution cotton may be dyed by the usual process applicable to sulfur dyestuffs in general.

4. A dyestuff exhibiting the normal solubilities and dyeing properties of a sulfur dye but being further characterized by containing in its structure the typical carbon-nitrogen complex of a phthalocyanine compound, said dyestuff being obtained by subjecting a polymercapto-phthalocyanine compound to oxidation.

5. Polydisulfide derivatives of metal-phthalocyanines.

6. A polydisulfide derivative of copper phthalocyanine.

7. A polydisulfide derivative of metal-free phthalocyanine.

8. In the process of producing a dyestuff of the phthalocyanine series, the step which comprises subjecting a polymercapto phthalocyanine to oxidation whereby to produce a polydisulfide phthalocyanine compound.

9. A process of producing a dyestuff of the phthalocyanine series, which comprises treating a poly-diazophthalocyanine compound with an alkali-metal xanthate, followed by hydrolysis to produce a corresponding poly-mercaptophthalocyanine compound, and then oxidizing the polymercapto compound thus obtained to a polydisulfide compound.

10. Polymercaptophthalocyanines.

11. A compound of the phthalocyanine series, characterized by possessing SH groups in its arylene nuclei, and by its capacity for yielding a sulfur dye upon selective oxidation of the SH groups.

12. Tetra-mercapto - metal - free - phthalocyanine.

13. Tetra-mercapto-metal-phthalocyanines.

14. Tetra-mercapto-copper phthalocyanine.

15. Tri-mercapto-copper phthalocyanine.

16. The process of dyeing textile fiber which comprises applying thereto from an alkaline bath containing an alkali-metal sulfide, a polydisulfide dyestuff of the phthalocyanine series, and then oxidizing the color on the fiber.

17. A compound of the general formula Q—(SH)$_x$, wherein $x$ is a numeral not greater than 4, while Q is the radical of a phthalocyanine compound selected from the group consisting of the metal-free and metallic phthalocyanines of the benzene series.

NORMAN HULTON HADDOCK.